United States Patent [19]
Luciani et al.

[11] Patent Number: 6,012,670
[45] Date of Patent: Jan. 11, 2000

[54] MULTIPLE DYNAMO-ELECTRIC MACHINE PARTS HANDLING AND WINDING METHODS AND APPARATUS

[75] Inventors: Sabatino Luciani, Florence; Maurizio Mugelli, Siena, both of Italy

[73] Assignee: Axis USA, Inc., Tampa, Fla.

[21] Appl. No.: 09/112,180

[22] Filed: Jul. 8, 1998

Related U.S. Application Data

[62] Division of application No. 08/695,835, Aug. 7, 1996, Pat. No. 5,799,896.
[60] Provisional application No. 60/016,725, May 3, 1996.

[51] Int. Cl.⁷ .................................................. H02K 15/06
[52] U.S. Cl. .................................. 242/433.3; 242/439.4; 29/596
[58] Field of Search .......................... 242/433.4, 439.4, 242/443.1, 433.3; 29/596, 605

[56] References Cited

U.S. PATENT DOCUMENTS

| | | | |
|---|---|---|---|
| 4,087,054 | 5/1978 | Finegold . | |
| 4,775,271 | 10/1988 | Maccaferri | 414/225 |
| 4,817,256 | 4/1989 | Riti et al. | 29/33 L |
| 5,145,052 | 9/1992 | Santandrea et al. | 198/468.2 |
| 5,253,912 | 10/1993 | Andorlini et al. | 294/119.1 |
| 5,257,689 | 11/1993 | Lombardi et al. | 198/468.2 |
| 5,372,319 | 12/1994 | Dolgas . | |
| 5,653,014 | 8/1997 | Faraoni et al. | 29/732 |
| 5,799,896 | 9/1998 | Luciani et al. | 242/433.4 |

OTHER PUBLICATIONS

Abstract of JP 02 250642, Aug. 10, 1990.
"The Aumann Production Line AFS for Manufacturing Armatures for Universal Motors", Willy Aumann KG, Espelkamp, Germany, 1987.
"The Aumann Production–Systems; Armature Winding Machines AEW, ADW", Willy Aumann KG, Espelkamp, Germany, 1988.

*Primary Examiner*—Katherine A. Matecki
*Attorney, Agent, or Firm*—Fish & Neave; Robert R. Jackson; Brajesh Mohan

[57] ABSTRACT

A transfer mechanism is operatively disposed between a conveyor for dynamo-electric machine parts (such as electric motor armatures) and apparatus for simultaneously processing a plurality of those parts (e.g., by winding coils of wire on those parts). The transfer mechanism delivers processed parts to the conveyor and receives unprocessed dynamo-electric machine parts from the conveyor, one at a time in a single alignment position, at least partly concurrent with the processing of other parts. Loss in production time due to wire breakage at the processing apparatus is reduced by substantially instantaneously controlling the broken wire (e.g., by retracting that wire relative to the associated wire dispenser) while continuing to move the wire dispensers.

8 Claims, 5 Drawing Sheets

MULTIPLE DYNAMO-ELECTRIC MACHINE PARTS HANDLING AND WINDING METHODS AND APPARATUS

This application claims the benefit of United States provisional application Ser. No. 60/016,725, filed May 3, 1996. This application is a division of U.S. application Ser. No. 08/695,835, filed Aug. 7, 1996, now U.S. Pat. No. 5,799,896.

BACKGROUND OF THE INVENTION

This invention relates to dynamo-electric machine parts manufacturing equipment, and more particularly to dynamo-electric machine parts manufacturing equipment which is capable of delivering and receiving dynamo-electric machine parts such as armatures or stators for electric motors, generators, alternators, or the like at the conveyor in a single alignment position, while simultaneously processing two or more other similar parts, and which reduces the amount of production time lost due to wire breakage at the winders.

There is always an interest in achieving high rates of productivity in a manufacturing line. In a manufacturing line for dynamo-electric machine parts it is customary for parts to travel along a conveyor, alongside of which are disposed various workstations for further processing. In order to increase productivity it is important to minimize the time these workstations have to wait for parts. Accordingly, it is important that these workstations are capable of delivering parts to the conveyor and receiving parts from the conveyor while substantially simultaneously processing parts, and the conveyor advances only after it has received a processed part from the workstations.

It is also important that the manufacturing line is not completely stalled due to wire breakage at a multiple armature winder, and for it to be simpler and faster to restore a multiple armature winder to full operation after such a breakage.

It is therefore an object of this invention to provide improved apparatus for delivering and receiving dynamo-electric machine parts such as armatures or stators at the conveyor in a single alignment position while the winder is substantially simultaneously processing multiple other parts of a similar kind.

It is another object of this invention to provide improved apparatus for reducing the time workstations have to wait to receive parts.

It is still another object of this invention to provide improved apparatus for making it possible for a multiple armature winder to continue partial operation despite a wire breakage in one portion of the winder, and for making it simpler and faster to restore a multiple armature winder to full operation after a wire breakage.

SUMMARY OF THE INVENTION

These and other objects of the invention are accomplished in accordance with the principles of the invention by providing improved apparatus to deliver processed dynamo-electric machine parts to the conveyor and to receive unprocessed parts from the conveyor in a single alignment position or transfer location while a multiple winder served from that single transfer location is operating.

The parts are serially conveyed on a conveyor to and from the single alignment position or transfer location. At the single alignment position the parts are removed from the conveyor one at a time and held in a transfer mechanism until multiple parts can be supplied to the winder substantially simultaneously. In the winder two or more parts are processed substantially simultaneously by multiple winding mechanisms. While these parts are being processed, previously processed parts are delivered to the conveyor (preferably one at a time at the same single alignment position from which unprocessed parts are removed from the conveyor), and more unprocessed parts are received from the conveyor.

Because the apparatus is able to deliver processed parts and receive unprocessed parts while the winder is operating, it saves undue delay in the production line. In addition, the conveyor only advances a step when it has received a processed part.

In order not to stall the production line and maintain at least partial production in the winder when a wire breaks in the winder, any broken wire is immediately detected and controlled to prevent further inadvertent dispensing of that wire. For example, this may be done by retracting a broken wire relative to the associated dispenser so that continued motion of that dispenser does not cause further dispensing of the broken wire. This prevents the broken wire from becoming tangled in the winder and allows other parts of the winder to continue productive operation.

Further features of the invention, its nature and various advantages will be more apparent from the accompanying drawings and the following detailed description of the preferred embodiments.

BRIEF DESCRIPTION OF THE DRAWINGS

FIG. 1 is a simplified partial elevational view of a portion of illustrative apparatus constructed according to the present invention, taken along the direction of the longitudinal axis of an armature to be gripped. FIG. 1 also shows a partial sectional view of the conveyor taken along the line 1'—1' in FIG. 2.

FIG. 2 is an elevational view taken generally along the line 2—2 in FIG. 1 when the holders of the first transfer mechanism are rotated and with additional illustrative apparatus constructed according to this invention. FIG. 2 shows elements broken off in FIG. 1, albeit at a different scale and from a different direction. FIG. 2 also shows a partial elevational view of the conveyor.

DETAILED DESCRIPTION OF THE PREFERRED EMBODIMENTS

The present invention relates to dynamo-electric machine parts manufacturing equipment which is capable of delivering and receiving dynamo-electric machine parts (such as armatures or stators for electric motors, generators, alternators, or the like) at the conveyor in a single alignment position, while simultaneously processing two or more previously received parts. Although the invention will be illustrated in conjunction with an endless conveyor on which armatures are conveyed in seats, it will be understood that other types of parts (such as stators) and/or other types of conveyance (such as palletized conveyance) can be used instead if desired.

Figure 1:
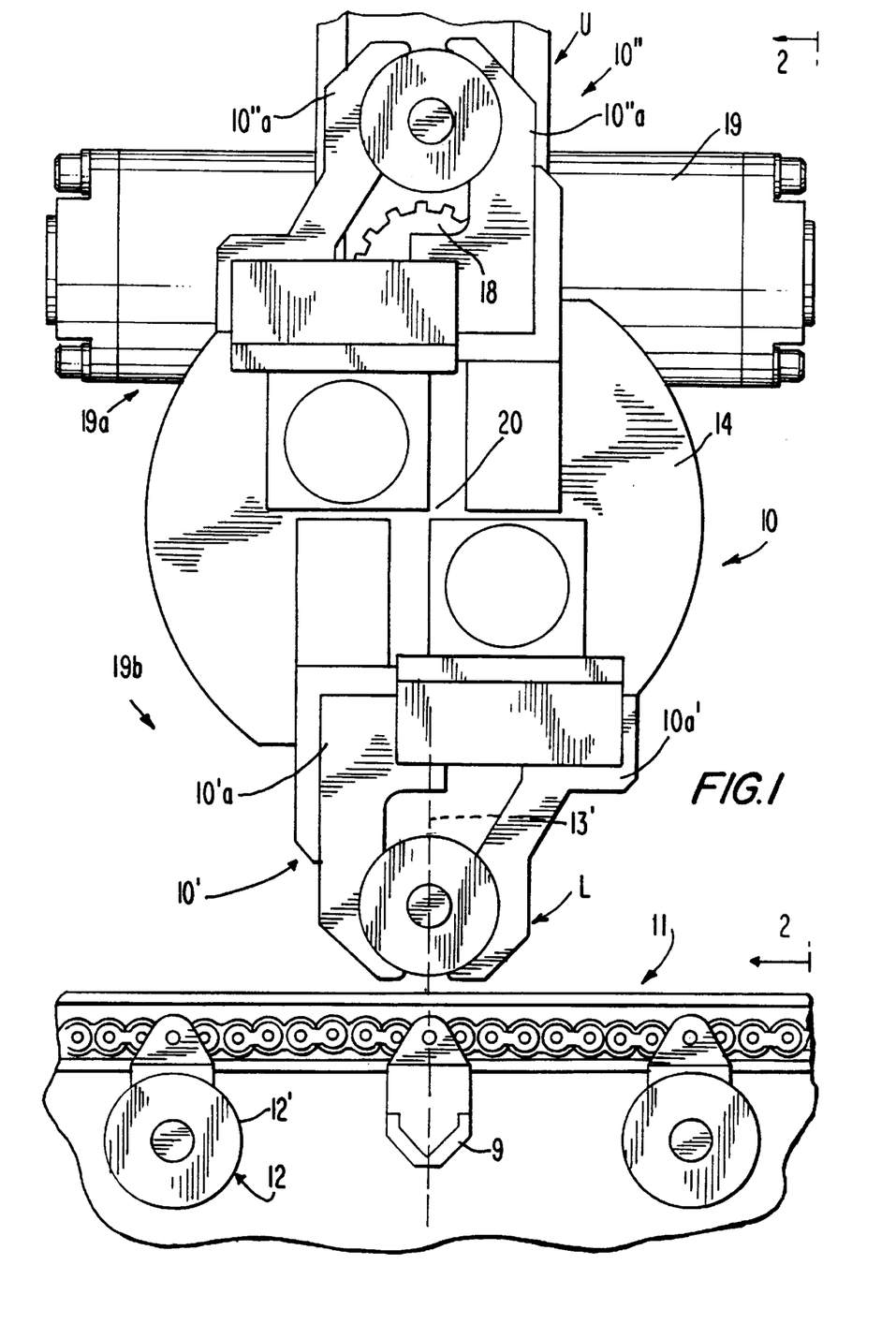

FIG. 1 shows a sub-unit 10 of the transfer device pertaining to this invention positioned over a conveyor 11. The conveyor is required for transporting the armature cores (e.g., assembled armature shaft, commutator, and ferromagnetic core) which need to be wound to the multiple armature winder. The same conveyor 11 also transports the armatures wound by the multiple armature winder to a downstream station for further processing, e.g., a fusing operation. The unwound armature cores 12 to be transferred to the multiple armature winder for winding become centered by the conveyor on vertical axis 13'. (In FIG. 1 an empty seat 9 of the conveyor is shown aligned on axis 13'. This seat is empty because an armature has already been removed for transfer to the multiple armature winder).

Sub-unit 10 is provided with two grippers 10' and 10" for grasping armatures around their core stack 12'. In FIG. 1, the grippers are shown grasping armatures and positioned on axis 13' over the conveyor. Grippers of this type are provided with index mechanisms which rotate the armature once they have grasped it. This index operation is required to locate in a predetermined angular position the commutator tangs and the stack slots of the armatures for winding and lead connection by the multiple armature winder. These grippers can be the same as those described in Andorlini et al. U.S. Pat. No. 5,253,912, which is hereby incorporated by reference herein. Therefore, their detailed structure and operating principles will be examined only in those aspects which are required to fulfill the description requirements of this invention.

Figure 2:
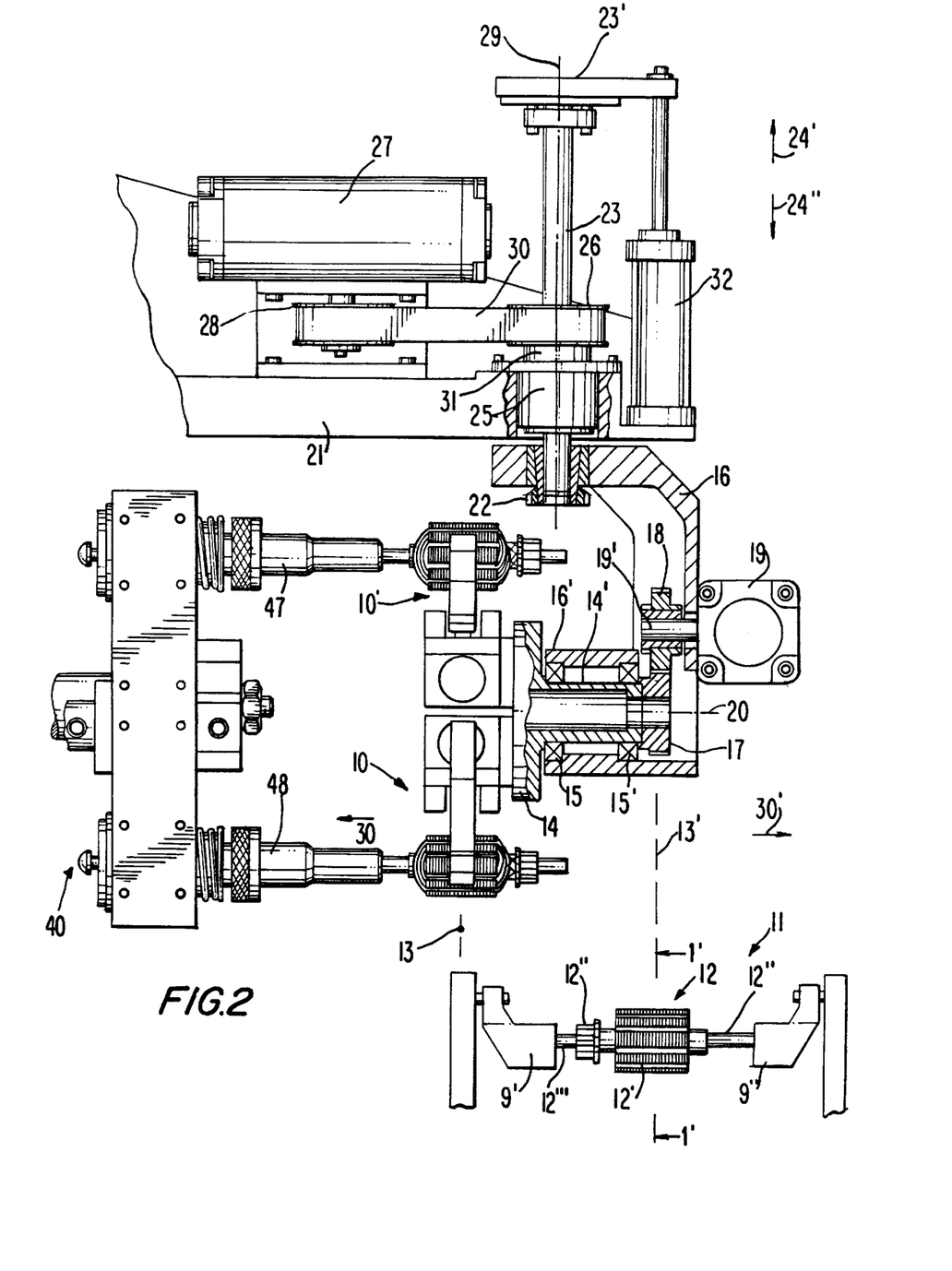

As shown in FIGS. 1 and 2, grippers 10 and 10" are fixed to a common support plate 14. Each gripper has two movable jaws (10'a for gripper 10' and 10"a for gripper 10") to grasp the most external circumferential surface of the stack 12'. In a normal rest position of sub-unit 10 the openings between the jaws when they are grasping a respective armature are centered on axis 13 (as shown in FIG. 2) or on axis 13' over the conveyor (as shown in FIG. 1). Support plate 14 has on its rearward side a cylindrical prolongation 14' supported on bearings 15 and 15' seated in an annular portion 16' of support arm 16. The free end of the cylindrical prolongation has flanged to it a gearwheel 17. This gearwheel meshes with a pinion 18 keyed to a shaft 19' of air cylinder 19. Air cylinder 19 is mounted on support arm 16. Shaft 19' is made to rotate for a certain angle in a clockwise 19a or anticlockwise 19b direction depending on which side of the air cylinder becomes supplied with air.

By rotating shaft 19' for such an angle, pinion 18 and gearwheel 17 will turn so that the support plate becomes rotated for 180° around center axis 20 in either of the two cited directions. Support structure for this rotation is obtained by the assembly of prolongation 14' on inner running rings of bearings 15 and 15', while the outer rings of these bearings are fixed to annular portion 16'. As described, the 180° rotation of the support plate makes the grippers rotate around center axis 20, which causes them to exchange their respective positions on axis 13' over the conveyor. In other words, for such a rotation the situation of FIG. 1 will be that gripper 10' moves to occupy the upper U position occupied by gripper 10", and at the same time gripper 10" will move to occupy the lower position L occupied by gripper 10'. After this exchange of positions, the center of the jaw openings when grasping the armatures will still be positioned on axis 13' over the conveyor.

By having the jaw openings, when grasping the armatures, centered on axes 13 or 13', the longitudinal axes of the armatures will be aligned with axes or positions which will be more fully described in the following.

Support arm 16 extends upwardly toward a frame structure 21. At its upward end support arm 16 is bolted by means of nut 22 to an end of vertical shaft 23. This shaft is supported for vertical movement in either of directions 24' and 24" by a guide unit 25. Vertical shaft 23 is connected at its upper end to the rod of air cylinder 32 by horizontal bracket 23'. By pressurizing the lower chamber of air cylinder 32, vertical shaft 23 will be moved upwardly in direction 24', while by pressurizing the upper chamber of air cylinder 32, vertical shaft 23 will be moved downwardly in direction 24".

In the embodiment of the invention which is represented in FIG. 2, shaft 23 rotates around axis 29 by having pulley wheel 26 flanged to a sleeve 31 extending from guide unit 25. Still in this embodiment, pulley wheel 26 is connected to a drive pulley wheel 28 keyed to the shaft of air cylinder 27. Air cylinder 27 is fixed to frame structure 21. The connection between pulley wheels 26 and 28 is obtained by means of belt 30. The drive pulley wheel 28 will rotate for a certain angle, either in a clockwise or in an anticlockwise direction, depending on which side of air cylinder 27 is supplied with air. By means of the belt connection between drive pulley wheel 28 and pulley wheel 26, this rotation by means of air cylinder 27 will cause shaft 23 to rotate around axis 29 for 180°, either in a clockwise or anticlockwise direction, again depending on which side of the air cylinder is supplied with air.

The rotation of shaft 23 around axis 29 will cause the support arm to do the same, which consequently moves the grippers between being positioned on axis 13 and on axis 13'. On axis 13, the grippers will be facing direction 30 (as they are shown in FIG. 2) to deliver the armatures they are grasping to another sub-unit 40 or to receive armatures from the same sub-unit if they are empty. On axis 13', the grippers will be facing direction 30' to deliver or to receive armatures carried by a seat of conveyor 11.

The seat of conveyor 11 consists of two opposite V supports 9' and 9", each hinged to a respective chain. An armature is carried in the seat by supporting the ends of shafts 12'" in these V supports.

As shown in FIG. 2, on axis 13, in one possible situation, the shafts of the armatures held by the grippers will be aligned with grippers 47 and 48 of the second sub-unit 40. In the situation of FIG. 2 grippers 47 and 48 of sub-unit 40 are shown delivering wound armatures to grippers 10' and 10" of sub-unit 10.

With reference to FIG. 1, to receive an armature from the conveyor when the grippers are on axis 13', the gripper of sub-unit 10 in the lower position L must be empty and have its jaws open. Then support arm 16 can descend to bring the open jaws in a condition where the latter straddle around the stack 12' of the armature positioned in a conveyor seat which has been previously aligned on axis 13'. To cause this descent, air cylinder 32 becomes pressurized in its upper chamber so that vertical shaft 23 will move in direction 24" along axis 29 for a predetermined path, which brings the jaws in position to grip the stack of the armature presented on axis 13' by the conveyor. Subsequently, the jaws can be closed to grip the stack, and soon thereafter the support arm can be raised by pressurizing air cylinder 32 in its lower chamber so that vertical shaft 23 will move in direction 24'.

Once the jaws gripping the armature stack have cleared the conveyor by moving in direction 24', air cylinder 19 can be pressurized to rotate support plate 14 in order to bring the other gripper in the lower position L. When the other gripper is in the lower position, similar operations as those described previously can be performed to have this gripper receive an armature from another seat of the conveyor which becomes aligned on axis 13'.

Once both the grippers of sub-unit 10 are grasping unwound armatures received from the conveyor, air cylinder 27 can be pressurized to cause rotation of support arm 16 so that the shafts of these armatures become aligned with respective grippers 41 and 42 (FIG. 3) of sub-unit 40 when sub-unit 10 reaches alignment on axis 13 as shown in FIG. 2.

FIG. 2 shows an embodiment of sub-unit 10 which is able to receive from the conveyor armatures which have their commutator 12" on the left side according to the view shown in FIG. 2. As will become apparent from the following (and in particular from the description of sub-unit 40), this orientation of the armatures requires the rotation around axis 29 by means of air cylinder 27 to orient the armatures properly for delivery to the winder. If the conveyor were to transport the armatures with the commutator on the right (opposite to the machine side of the conveyor), then the rotation around axis 29 would not be required.

In this latter case there can be an alternative embodiment of sub-unit 10 without the rotation transmission consisting of air cylinder 27, pulley wheels 26 and 28, and belt 30. In this alternative embodiment grippers 10' and 10" would be permanently aligned on axis 13' and the alignment with the grippers of sub-unit 40 would be obtained by the position which support arm 16 reaches for the maximum upwards extension of air cylinder 32.

Figure 3:
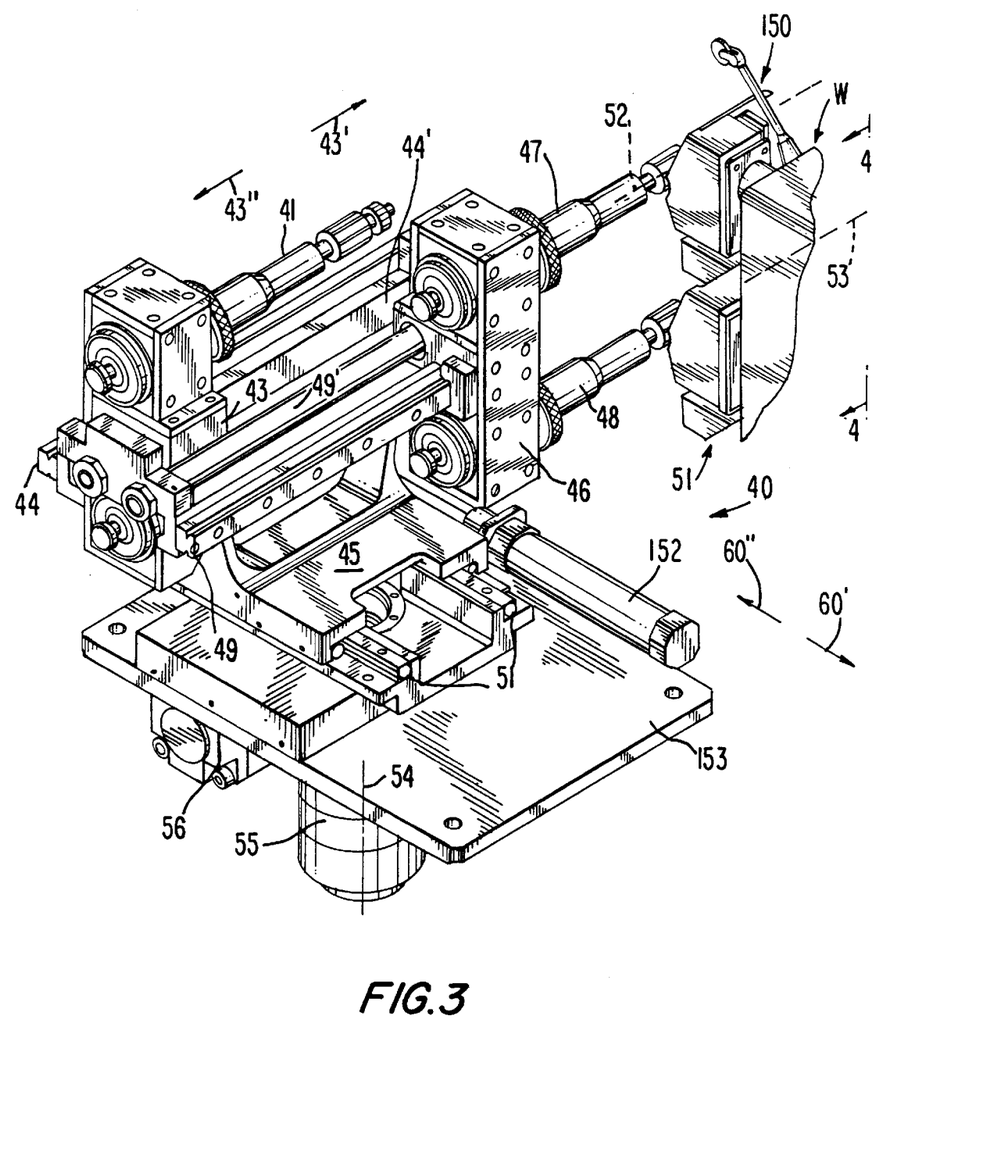
FIG. 3 is an isometric view of a portion of the apparatus shown in FIG. 2 with still more apparatus constructed according to the invention.

FIG. 3 shows in greater detail sub-unit 40, which transfers armatures between sub-unit 10 and the multiple armature winder W. The chucks and the flyer assemblies of one side of the multiple armature winder are referenced 50 and 51, while those of the other side are not shown. In FIG. 3, the winding axes on which the armatures need to be positioned for winding by the multiple armature winder have been referenced 52 and 53.

Grippers 41 and 42 (gripper 42 remains hidden in FIG. 3), parallel to each other for holding armatures to be wound, are mounted on slide 43, which is able to translate on guide 44 in directions 43' and 43" by means of air cylinder 44'. Guide 44 is fixed to one side of support structure 45. By translating in direction 43' the slide moves toward a forward end of structure 45. The movement in direction 43' allows grippers 41 and 42 to receive armatures to be wound from grippers 10' and 10" from sub-unit 10 or to deliver the same armatures to collets of the multiple winder positioned on winding axes 52 and 53.

Translation in direction 43" causes the slide to move to a rearward end of central structure 45. This translation is required to take the armatures to be wound away from grippers 10' and 10" of sub-unit 10, or to retract grippers 41 and 42 away from the winder after the armatures to be wound have been delivered to the collets of the winder positioned on winding axes 52 and 53.

Similarly, on the other side of the central structure there is a second slide 46 for movement of grippers 47 and 48, which are necessary for holding armatures that have been wound by the multiple armature winder.

Grippers 47 and 48 are mounted on slide 46, which is able to translate on guide 49 in directions 43' and 43" by means of air cylinder 49'. Guide 49 is fixed to one side of support structure 45. By translating in direction 43' the slide moves toward a forward end of structure 45. This movement is required to deliver wound armatures held by grippers 47 and 48 to grippers 10' and 10" of sub-unit 10, or to receive in grippers 47 and 48 wound armatures from the collets of the winder positioned on winding axes 52 and 53.

Translation in direction 43" causes slide 46 to move to a rearward end of central structure 45. This translation is required to retract grippers 47 and 48 away from grippers 10' and 10" after wound armatures have been delivered to the latter, or to remove grippers 47 and 48 from the winder once they are holding wound armatures. Structure 45 can translate between two sideways positions because it is mounted on guides 51 of base 153. Air cylinder 152, connected to structure 45, can be used to cause this translation.

Base 153 is supported for rotation around axis 54 by being mounted on bearing column 55. Air cylinder 56 has a pinion (not shown) which meshes with gearwheel (not shown) integral with base 53 to obtain this rotation around axis 54. By supplying pressurized air alternatively to the two chambers of air cylinder 56, base 153 is rotated around axis 54, either in a clockwise or anticlockwise direction, depending on which chamber is supplied. This causes grippers 41, 42, 47, and 48 to move between a position where the grippers face the multiple winder and a position where they are facing sub-unit 10.

The operations of sub-unit 40 for transferring wound armatures from the winder to sub-unit 10, and then for transferring unwound armatures to winder W will now described. A start condition for this description can be the situation where grippers 47 and 48 are in the forward position (as shown in FIG. 3), ready to remove wound armatures from the winder. In this situation unwound armatures delivered by grippers 10' and 10" are held by grippers 41 and 42. Once grippers 47 and 48 have retracted from the winder to remove the wound armatures (by activating air cylinder 49', which moves slide 46 in direction 43"), structure 45 translates in direction 60' by means of air cylinder 52 to align grippers 41 and 42 with the winder axes 52 and 53. Then slide 43 can be moved forward in direction 43' by means of air cylinder 44 to allow the collets of the winders to receive the unwound armatures from grippers 41 and 42.

Once grippers 41 and 42 have delivered these armatures and retracted from the winder, the winder can start winding again, and base 153 can be rotated by means of air cylinder 56 for 180° around axis 54 to make the grippers face sub-unit 10. At the end of this rotation, grippers 41 and 42 (which are empty) will be aligned with grippers 10' and 10" of sub-unit 10 (which will be positioned on axis 13) and holding unwound armatures ready to be delivered. Then grippers 41 and 42 can move forward to receive the unwound armatures, and immediately after this they can retract to their backward position by inverting the supply of air cylinder 44'. Following this, structure 45 will move sideways in direction 60' to align grippers 47 and 48 with grippers 10' and 10" so that the former can move forward to deliver the wound armatures. As soon as this delivery has been accomplished, and after grippers 47 and 48 have moved backward, support arm 16 will rotate around axis 29 to bring grippers 10' and 10" on axis 13' over the conveyor. Simultaneously to this rotation, base 153 will rotate around axis 54 to align empty grippers 46 and 47 with the winding axes of the winder. Once this alignment with the winder axes has been reached, grippers 47 and 48 will wait until the winder has finished winding, and only then will these grippers move forward to receive the wound armatures to be transferred back to sub-unit 10 in the same way that has been described previously.

When grippers 10' and 10" are positioned on axis 13' to deliver to the conveyor the wound armatures received from sub-unit 40, an empty seat of the conveyor will be aligned therebelow. This seat had previously carried an armature to be wound to sub-unit 10 and is waiting to receive a wound armature which needs to be conveyed to a next processing machine (e.g., a fusing machine).

The operation steps for sub-unit 10 from this point onward are the following: Support arm 16 descends to allow the gripper of the lower position L to deposit a wound armature in the waiting empty seat of the conveyor. Then, support arm 16 is raised to allow this empty gripper to clear the conveyor by the upward motion of support arm 16. Once this has occurred, a new seat of the conveyor with an unwound armature is positioned in alignment on axis 13'. Then, support arm 16 descends again to allow the empty gripper to pick up an unwound armature, which has just been presented by the new seat of the conveyor. Once the gripper has grasped this unwound armature and has cleared the conveyor by the upward motion of support arm 16, the grippers of sub-unit 10 exchange their positions by rotating around axis 20 through the activation of air cylinder 19. This will bring the gripper that was in the upper position with a wound armature to lower position L and the gripper with the unwound armature to the upper position U. In this situation, the gripper which is now in the lower position can descend to deposit the wound armature in the seat which had brought the unwound armature now being held by gripper in the upper position.

Following deposit of the wound armature on the empty seat of the conveyor by the gripper in the lower position, a new seat with an unwound armature becomes aligned on axis 13'. Then, the gripper in the lower position can descend again to pick up the second unwound armature. Once this has occurred and the conveyor has been cleared, support arm 16 can be rotated by means of air cylinder 27 to align the unwound armatures with grippers 41 and 42 of sub-unit 40. The seat of the conveyor that has just been unloaded of an unwound armature will continue to wait in alignment with axis 13' until sub-unit 10 is ready again to deposit on it a wound armature.

In the case of the alternative embodiment of sub-unit 10 which does not have the rotation possibility around axis 29 and therefore interfaces with a conveyor that transports the armatures with the commutator on the right side, support arm only moves up and down in directions 24' and 24" to pick up or deliver the armatures and to align them with grippers 41 and 42 of sub-unit 40.

From the foregoing description, it should be clear that the transfer solution consisting of the combination of sub-unit 10 and sub-unit 40 makes it possible to transfer armatures between seats of the conveyor which become positioned in a single load/unload position (in alignment with axis 13') and the multiple armature winder. This allows a step-by-step advancement conveyor like the one described previously to be used to feed armatures both to a multiple armature winder and to a further processing machine such as a fusing machine which also receives and delivers armatures via seats of the conveyor that become positioned in a single downstream load/unload position. These two types of machines will be fed synchronously by the conveyor. More precisely, the step-by-step advancement of the conveyor to present the unwound armatures to sub-unit 10 of the multiple armature winder will present at the same time armatures to be fused to a transfer device of the fusing machine situated downstream, and take away wound armatures delivered by sub-unit 10 and fused armatures delivered by the transfer device of the fusing machine.

To achieve a required production rate in a portion of a manufacturing line having these machines fed by the conveyor, and to take advantage of the maximum production capability of these machines, in designing such a solution there must be a correct choice in the values relating to the following parameters: production rates of each of the two types of machines, timing of the transfer devices for transferring armatures between the conveyor and the machines, and the timing required for the conveyor to advance seats in order to present them at the load/unload positions of the machines.

There must also be predetermined synchronization between all the operating stages which need to occur, i.e., operating stages of the machines, operating stages of the transfer devices, and the advancements of the conveyor.

The criterion for advancement of the conveyor needs to be that it should advance by a step only when both the seat at the winding machine and the seat at the fusing machine have received a processed armature. Furthermore, the machines should be kept in operation for as long as possible and have to wait the least possible inoperative time for receiving armatures with their transfer devices. Thus, the transfer devices need to be extremely rapid in receiving and delivering armatures with the machines, and they must have a preparation period for being ready to do so which is short enough and set to occur when the machines are operating. For the specific example of the multiple armature winder and the fusing machine fed by the same conveyor, the two advancements of the conveyor described previously to receive and deliver armatures by means of sub-unit 10 for one operating cycle of the multiple armature winder will coincide with loading and unloading required for two operating cycles of a fusing machine which fuses one armature at a time.

Still within this specific example, the multiple winder will be inoperative only for the time which sub-unit 40 is required to move forward and rearward grippers 41, 42, 47, and 48, as has been described above for loading and unloading armatures in front of the winder by sub-unit 40, and for the time to exchange these grippers in front of the winder by translating structure 45 in direction 60'. Thus, the rotation of base 153 to transfer armatures between sub-unit 10 and the winder occurs when the latter is winding. Even the operations of sub-unit 10 to deliver and receive armatures with the seats of the conveyor and the advancements of these seats will occur when the winder is operating.

Note at this point that the intermediate transfer device of Santandrea et al. U.S. Pat. No. 5,145,052 does not allow the winder to operate when it rotates to present grippers to the transfer device located over the conveyor. Thus the combination of sub-units 40 and 10, according to the principles described herein, makes it possible to achieve a higher productivity of the multiple armature winder than that which is achieved with the solutions of the Santandrea et al. '052 patent.

With respect to the fusing machine, the related transfer unit will need to keep the inoperative time as short as possible and also guarantee that the time it will take to exchange armatures with the conveyor will have to be equal to or less than the time which is required to carry out similar operations with the grippers of sub-unit 10. This makes it possible to have synchronization between the operations of the transfer devices of the two machines.

The advantage of transferring armatures between seats of the conveyor aligned with a single position and the multiple armature winder is also useful when the conveyor is of a type having pallets carrying more than one armature at the same time. In these cases on the pallets, the distance between adjacent armatures may be such that there is not sufficient room to allow two adjacent pick-up grippers (like those of the Santandrea et al. '052 patent) to operate. With these types of pallets (e.g., pallets carrying two armatures), sub-unit 10 can be used successfully with operations similar to those described previously, to load and unload them. In this case a one-step advancement of the conveyor described previously will correspond to an advancement of the pallet which brings a new seat (the second seat) of the same pallet in alignment with sub-unit 10, or the advancement of another pallet to align its first seat because the previous pallet has been completely loaded and unloaded.

It will be appreciated that the parts transfer methods and apparatus of this invention are equally applicable to processing stators, which also comprise a ferromagentic core on which coils of wire must be wound.

Figure 4:
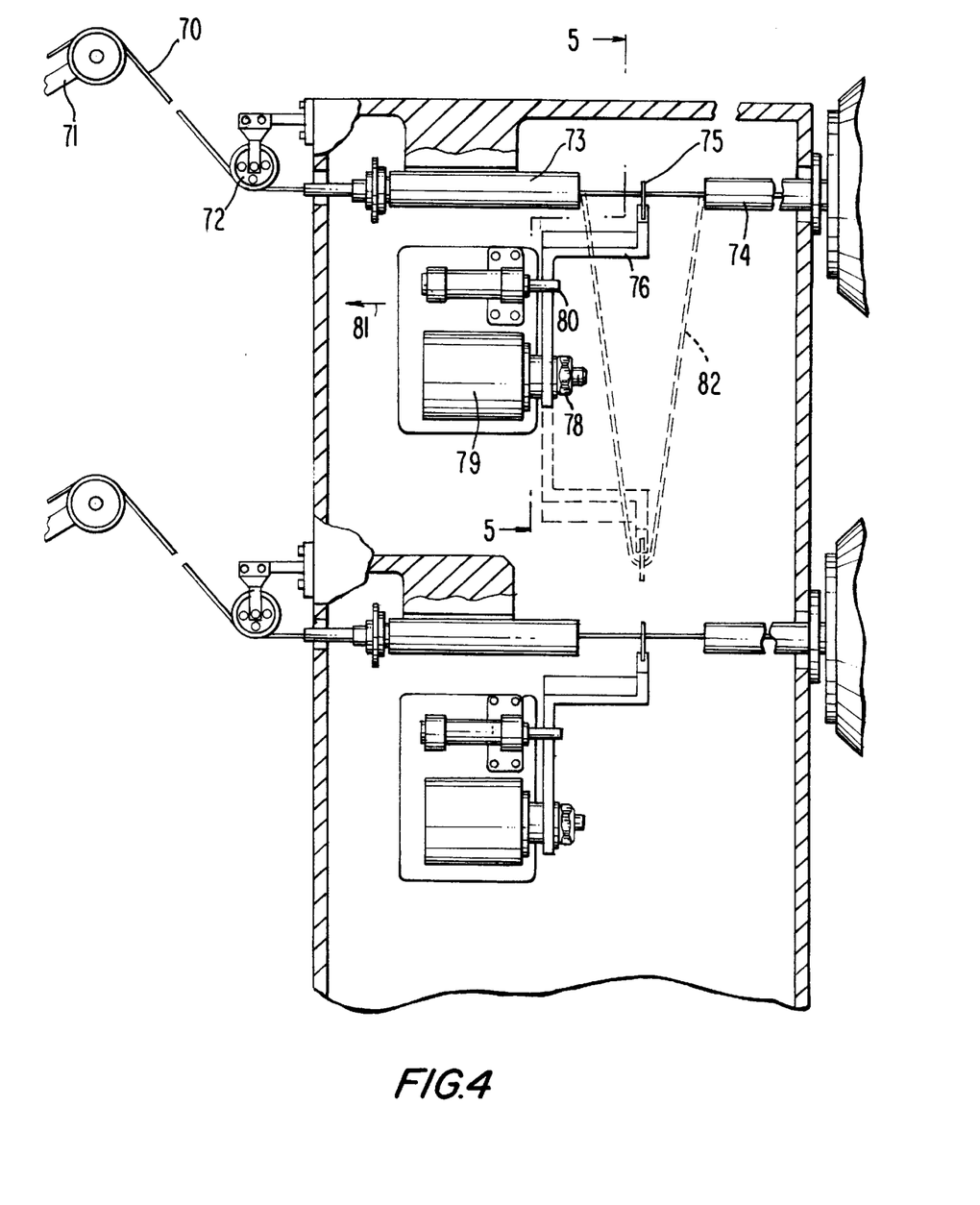
FIG. 4 is a sectional view taken generally along the line 4—4 in FIG. 3 showing an illustrative embodiment of additional aspects of the invention.
Figure 5:
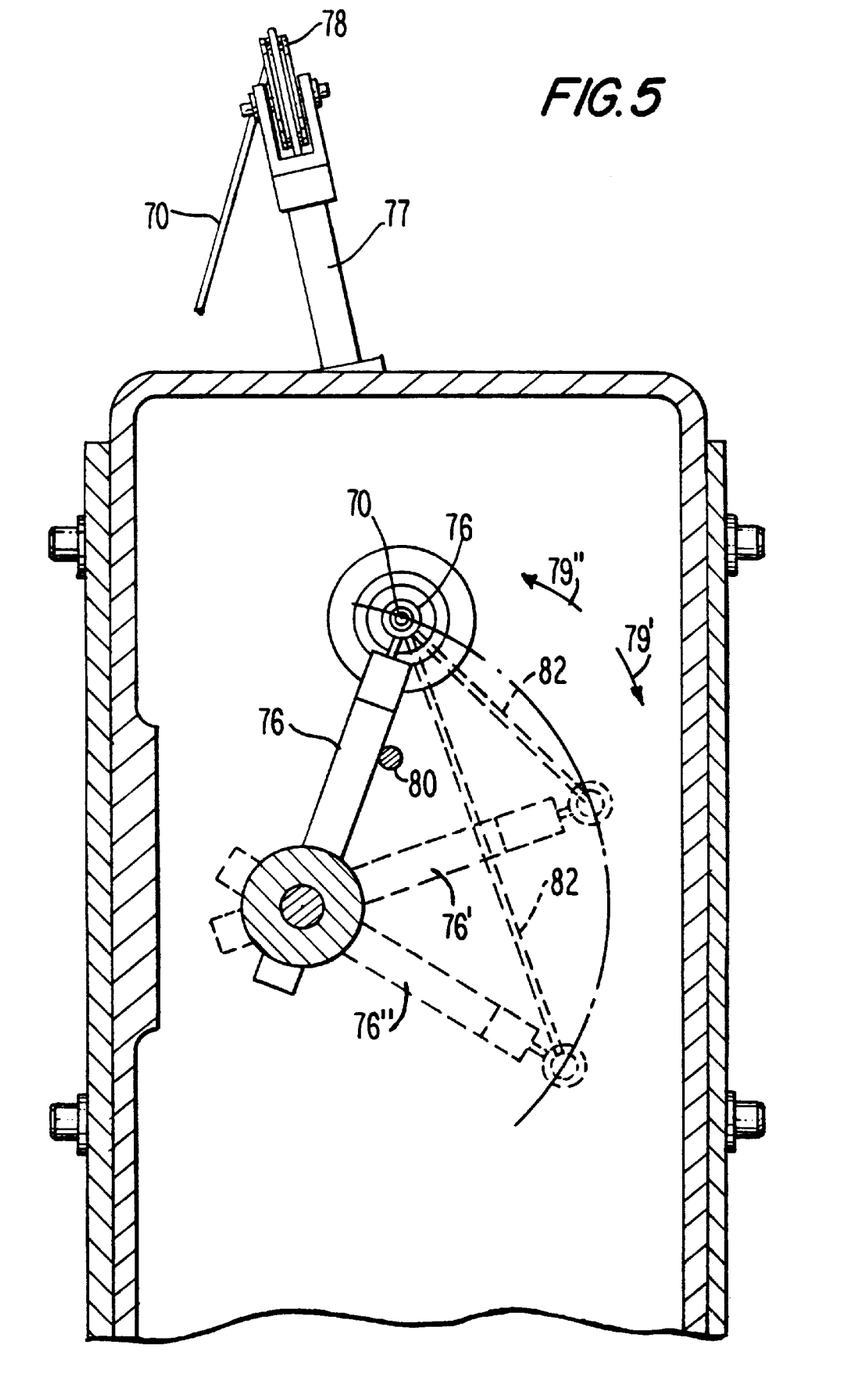
FIG. 5 is a sectional view taken along the line 5—5 in FIG. 4.

FIGS. 4 and 5 relate to the portion of this disclosure which presents improved operating principles of the multiple armature winder to increase its productivity.

As a premise, these principles are particularly useful for multiple armature winders which have rotation of two flyers on a same side of the multiple armature winder driven by a common motor. Each of these flyers winds one-half of the coils of a respective armature which it is winding. The two flyers on the other side of the multiple armature winder will have another common motor to drive their rotation. Each of these flyers will wind the other half of the respective armature which it is winding. To use this common motor for rotating the two flyers, instead of one motor for each flyer, reduces the cost of the motorization of the multiple armature winder. However, it may cause inconvenience when the wire breaks in one of the flyers. More particularly, when there is a common drive for two flyers, the breakage of any of the four wires causes the entire machine (four flyers) to be stopped until an operator intervenes to restore the feed of the broken wire in the flyer which was dispensing it. Therefore, during the time which passes between breakage of the wire and the intervention of the operator, the entire production capability of the multiple armature winder becomes lost.

This invention provides a solution which reduces the amount of production which is lost due to a wire breakage, and makes it simpler and faster for the operator to restore the multiple armature winder after such a breakage.

In most cases the point of breakage of the wire is between the flyer and the armature being wound. Therefore, successive rotation of the same flyer at the winding speed tends to dispense extra wire in an uncontrolled way due to the centrifugal forces which are developed. Ultimately the extra wire which is dispensed due to the centrifugal forces catches on parts of the winder and coils itself to form unwanted wire waste which the operator has to patiently remove before starting the machine again.

According to the principles of this invention, a detection unit can detect the breakage of any of the four wires going to their respective flyers. Once this unit signals the breakage, a device intervenes to instantaneously control the broken wire (e.g., by withdrawing that wire relative to the flyer) so that it will not be further dispensed by centrifugal forces. This control of the broken wire occurs while the flyers are rotating and results in a situation where the flyers without broken wires will continue to wind the coils which had been started before the breakage of the wire.

Once the flyers have finished winding these coils, the flyer opposite to the one where the wire has been withdrawn (i.e., the remaining flyer winding the armature where one of the wires has been broken) carries out traditional termination operations by means of flyer rotations to connect the lead of the last wound coil to the commutator. The wire is then cut between the flyer and the commutator, and the cut wire is promptly controlled (e.g., by withdrawing it relative to the flyer). If desired, the cut wire may be initially gripped in the conventional manner, but this grip is released in order to permit withdrawal of the wire.

During these termination operations, the armature where the wire has not broken also undergoes lead connection of the last wound coils to the commutator because a common drive exists between the opposite flyers. However, for the armature where there has not been a breakage of the wire, the wires are only connected to the commutator without carrying out the successive cutting and gripping operations (unless, of course, the last-wound coils are the final coils to be wound on the armature). This is possible because each flyer of the winder has its own independently driven cutter and gripping device. During these operations to connect the leads by means of flyer rotations, the flyer where the broken wire has been withdrawn will continue to rotate due to the common drive. However, there will not be the hazardous situation of having extra wire dispensed in an uncontrolled manner by centrifugal forces.

When winding of successive coils begins, both flyers for the armature where the breakage occurred are able to rotate without the danger of dispensing wire in an uncontrolled way. In this way the flyers for continuing to wind coils of the armature where the wire has not been broken may continue to do so by means of the common drives until all the coils are completed. Once the armature is completed, it can be removed from the winder and substituted with another unwound armature so that the multiple armature winder can continue to produce, even if it will only be doing so at half of its normal production capability.

When the operator does intervene, he will remove from the winder the armature where the wire was broken, and thread new wire through the flyers where withdrawal has occurred.

FIGS. 4 and 5 show illustrative devices for withdrawing the wires from the flyer. With reference to FIG. 4, wire 70 for winding coils of an armature passes from a dancer arm 71 which is part of a traditional tensioner device. Each flyer has a respective tensioner device for keeping the wire it is dispensing at the required tension for winding. After the dancer arm, the wire travels through wheel 72 which aligns the wire with a horizontal tube 73 through which it passes so that it can reach the rear end of flyer shaft 74. Between the tube and the rear end of the flyer shaft, the wire is threaded through a passing ring 75 which is part of withdrawal arm 76. After the rear end of the flyer shaft, the wire runs through the entire length of the flyer shaft to reach the outwardly extending arm 77 of the flyer and then the extreme dispensing pulley 78 from which it is dispensed to wind the armature coils. The flyer shaft, together with the extending arm, is rotated to achieve winding by the common motor described previously.

Withdrawal arm 76 is fixed by nut 78 to the shaft of rotation cylinder 79. By feeding pressurized air to cylinder 79, withdrawal arm 76 can be rotated for a certain angle in direction 79' and 79", depending on which side of air cylinder 79 is supplied (see FIG. 5).

When winding the armature coils by means of the flyer, the withdrawal arm will be in a normal operation position represented by full line representation 76 shown in FIGS. 4 and 5. In this position passing ring 75 is aligned with tube 73 and with the rear end of flyer shaft 74. Furthermore, cylinder 79 will be pressurized on a side which would rotate withdrawal arm in direction 79'. To impede this rotation during normal winding, pin 80 is used as an abutment for the arm. When breakage of the wire is detected, the related signal causes this pin to be retracted in horizontal direction 81 so that it moves out of the way to allow the withdrawal arm to rotate in direction 79' as shown by the two phantom representations 76' and 76" of FIG. 5. Representation 76" shows the position reached by the arm at the end of this rotation. During this rotation, wire 70 can not leave passing ring 75. Therefore, the stretch of wire going to the flyer is drawn rearwardly so that it becomes removed at least from extending arm 77, which continues rotating at winding speed. This removal of wire corresponds to extra wire extension 82 shown in phantom representation in FIGS. 4 and 5. The rotation of the withdrawal arm to remove the wire must occur rapidly. Otherwise the high-speed rotation of the extending arm will be able to draw further wire by means of the centrifugal forces. For this reason, cylinder 79 is already pressurized to make the withdrawal arm rotate in direction 79' quickly, thus avoiding delays to correctly pressurize the required chamber of cylinder 79. Pin 80 can be extremely rapid in moving out of the way if it is caused to do so by an electromagnetic translation drive.

The device which detects the breakage of the wire is well known and commonly used in the prior art to command flyer rotation when a wire breakage occurs during winding. Usually this device detects the breakage by measuring an abnormal oscillation of the dancer arm or a sudden variation of the wire travel due to the wire breakage.

The portion without numbering in FIG. 4 shows another withdrawal device applied to a lower flyer which is driven by the same motor which rotates flyer shaft 74.

Similarly, the flyers on the other side of the multiple armature winder will be provided with withdrawal devices like those shown in FIGS. 4 and 5, so that for each wire being wound, breakage can be detected and consequent withdrawal can occur.

When the operator is required to intervene after a breakage in order to restore the normal operating conditions of the winder, this can be a very simple operation because the broken wire will be in a predetermined position as is shown by extension 82 in FIG. 4. All the operator has to do is bring withdrawal arm 76 back to its normal position by actuating cylinder 79, thread the wire through the flyer shaft, and connect it to its respective termination gripper.

It will be understood that the foregoing is only illustrative of the principles of the invention and that various modifications can be made by those skilled in the art without departing from the scope and spirit of the invention. For example, the principles illustrated in FIGS. 4 and 5 are equally applicable to multiple armature winders in which separate motors are used for each winder.

The invention claimed is:

1. A method of operating a machine for simultaneously winding a plurality of coils of wire on each of two dynamo-electric machine armature cores, each coil being wound by wire emanating from a respective moving wire dispenser, each wire dispenser associated with each of said cores being powered to move in common with a wire dispenser associated with the other of said cores, said method comprising the steps of:

monitoring the wire extending via each of said wire dispensers to the associated core for possible breakage of the wire;

when breakage of any wire is detected, controlling that wire to prevent further dispensing of that wire from the associated wire dispenser; and after performing said controlling step, continuing to move said wire dispensers so that the wire dispensers associated with the core for which no wire is broken continue to wind coils on that core.

2. The method defined in claim 1 further comprising the steps of:

after breakage of any wire to a core is detected, cutting another wire extending to that core from another of said wire dispensers; and after performing said cutting step, controlling the cut wire to prevent further dispensing of that wire from the associated wire dispenser.

3. The method defined in claim 2 wherein each of said coils comprises a plurality of subcoils wound in succession with a wire lead connection to the associated core being formed between the winding of successive subcoils, and wherein said cutting step is performed after completion of a wire lead connection of the wire to be cut.

4. The method defined in claim 2 wherein said step of controlling the cut wire comprises the step of retracting the cut wire relative to the associated wire dispenser.

5. The method defined in claim 1 wherein said controlling step includes retracting the wire being controlled relative to the associated wire dispenser.

6. Apparatus for winding a coil of wire on a dynamo-electric machine part by moving a wire dispenser, from which said wire emanates, relative to said part, comprising:

a wire breakage detector for detecting breakage of said wire extending to said part via said dispenser; and a wire controller responsive to said detector for controlling said wire when said detector detects breakage of said wire so that said wire dispenser can continue to move without inadvertent further dispensing of wire.

7. The apparatus defined in claim 6 wherein said wire controller comprises:

a wire retractor for retracting said wire relative to said wire dispenser.

8. The apparatus defined in claim 7 wherein said wire retractor comprises:

a wire deflector which is normally in an inoperative position adjacent to a portion of the normal path of said wire upstream from said wire dispenser, said deflector being moveable to an operative position in which said deflector deflects said wire laterally from said portion of said normal path;

means for resiliently urging said deflector to move to said operative position; and means for releasably retaining said deflector in said inoperative position against the urging of said means for resiliently urging until said detector detects breakage of said wire.

* * * * *